United States Patent [19]

Gill

[11] Patent Number: 5,739,988
[45] Date of Patent: Apr. 14, 1998

[54] SPIN VALVE SENSOR WITH ENHANCED MAGNETORESISTANCE

[75] Inventor: Hardayal Singh Gill, Portola Valley, Calif.

[73] Assignee: International Business Machines Corporation, Armonk, N.Y.

[21] Appl. No.: 715,200

[22] Filed: Sep. 18, 1996

[51] Int. Cl.$^6$ .................... G11B 5/127; G11B 5/39
[52] U.S. Cl. .................................................. 360/113
[58] Field of Search .................... 360/113; 338/32 R; 324/252

[56] References Cited

U.S. PATENT DOCUMENTS

| | | | |
|---|---|---|---|
| 4,803,580 | 2/1989 | Mowry | 360/113 |
| 5,018,037 | 5/1991 | Krounbi et al. | 360/113 |
| 5,206,590 | 4/1993 | Dieny et al. | 324/252 |
| 5,260,652 | 11/1993 | Collver et al. | 324/252 |
| 5,341,261 | 8/1994 | Dieny et al. | 360/113 |
| 5,381,291 | 1/1995 | Madsen et al. | 360/113 |
| 5,475,550 | 12/1995 | George | 360/113 |
| 5,483,402 | 1/1996 | Batra | 360/113 |
| 5,508,866 | 4/1996 | Gill et al. | 360/113 |
| 5,508,867 | 4/1996 | Cain et al. | 360/113 |
| 5,574,605 | 11/1996 | Baumgart et al. | 360/113 |
| 5,583,725 | 12/1996 | Coffey et al. | 360/113 |
| 5,592,082 | 1/1997 | Kuriyama | 324/252 |

*Primary Examiner*—John H. Wolff
*Attorney, Agent, or Firm*—Paik Saber

[57] ABSTRACT

A spin valve magnetoresistive (MR) read sensor is provided wherein the free and pinned layer magnetization are perpendicular to each other under quiescent conditions and the current flowing in the free MR layer is oriented to flow at a substantially 45 degree angle with respect to the free layer magnetization. The flow of the current at the 45 degree angle with respect to the free layer magnetization causes the AMR effect which is present in the free MR layer to be added to the spin valve sensor GMR effect and increases the overall magnetoresistive effect by about 25% to 33%.

22 Claims, 10 Drawing Sheets

$$\frac{\Delta R}{R} \approx 3\text{-}4\%$$

SPIN VALVE SENSOR WITH ENHANCED MAGNETORESISTANCE

BACKGROUND OF THE INVENTION

1. Technical Field

This invention relates in general to a magnetoresistive read sensor for reading signals recorded in a magnetic medium and, more particularly, this invention relates to a spin valve magnetoresistive read sensor with enhanced giant magnetoresistance effect.

2. Description of the Background Art

A magnetoresistive (MR) read sensor, commonly referred to as an MR head, has been shown to be capable of reading data from a surface of a magnetic disk at greater linear densities than thin film inductive heads. An MR sensor detects a magnetic field through the change in the resistance of its MR sensing layer (also referred to as "MR element") as a function of the strength and direction of the magnetic flux being sensed by the MR sensing layer. MR read sensors are of great interest for several reasons: MR sensors' intrinsic noise is lower than inductive sensors' intrinsic noise, thus providing improved signal-to-noise (S/N) performance; MR sensors sense magnetic flux ($\phi$) as compared to inductive heads which sense the time rate of flux change, $d\phi/dt$, thus making the reproduction of the signal recorded on a medium independent of the relative velocity between the MR sensor and the medium; and MR sensors have bandwidth in the gigahertz (gHz) range which allows area storage density well in excess of one gigabit per square inch.

MR sensors currently being used or under development fall into two broad categories: 1) anisotropic magnetoresistive (AMR) sensors manifesting the AMR effect and 2) giant magnetoresistive (GMR) sensors manifesting the GMR effect.

Figure 1A:
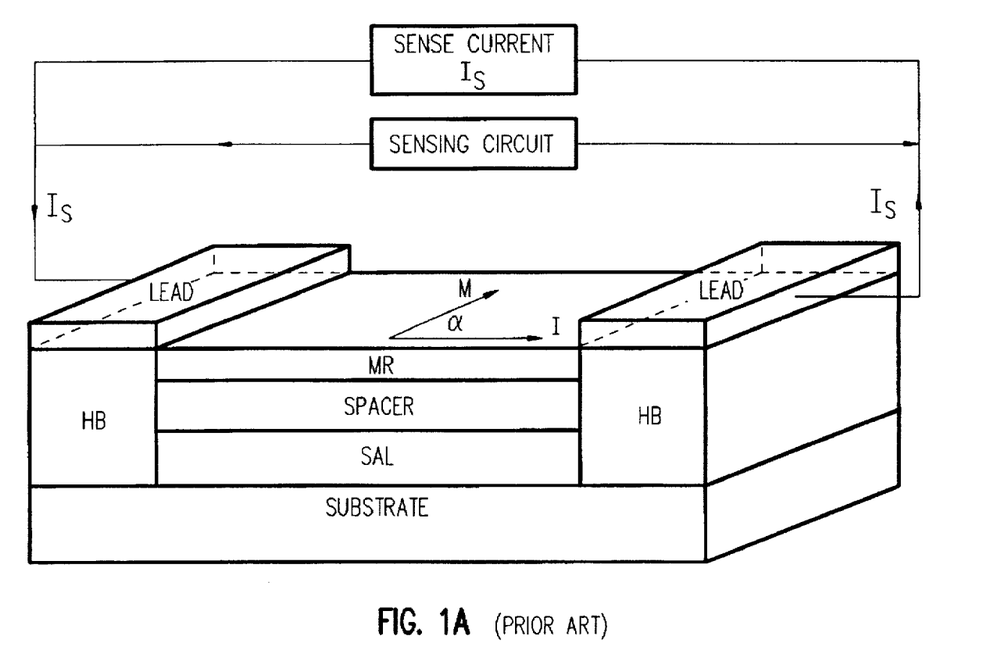
FIG. 1A and 1B are perspective and ABS views of a prior art AMR sensor, respectively.

In the AMR sensors, the electron scattering and therefore the resistance of the MR layer varies as the function of $\cos^2\alpha$ where $\alpha$ is the angle between the magnetization of the MR layer and the direction of the sense current flowing in the MR layer (FIG. 1A). The electron scattering and therefore the resistance is highest for the case where the magnetization of the MR layer is parallel to the current and minimum when the magnetization of the MR layer is perpendicular to the current. U.S. Pat. No. 5,018,037 entitled "Magnetoresistive Read Transducer Having Hard Magnetic Bias", granted to Krounbi et al. on May 21, 1991, discloses an MR sensor operating on the basis of the AMR effect.

Figure 1B:
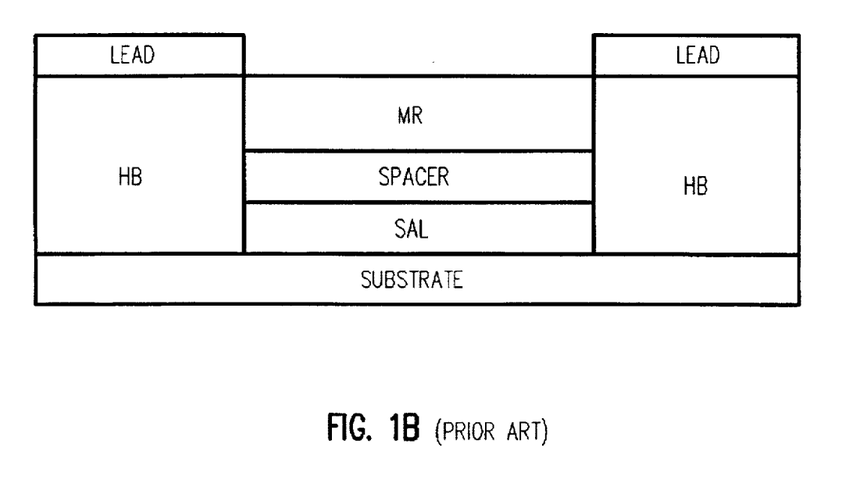

FIG. 1B shows a prior art AMR sensor comprising a ferromagnetic MR layer of NiFe exhibiting about 2% magnetoresistive effect (i.e., $\Delta R/R=2\%$).

In the GMR sensors, the resistance of the MR sensing layer, varies as a function of the spin-dependent transmission of the conduction electrons between the magnetic layers separated by a non-magnetic layer and the accompanying spin-dependent scattering which takes place at the interface of the magnetic and nonmagnetic layers and within the magnetic layers.

Figure 2A:
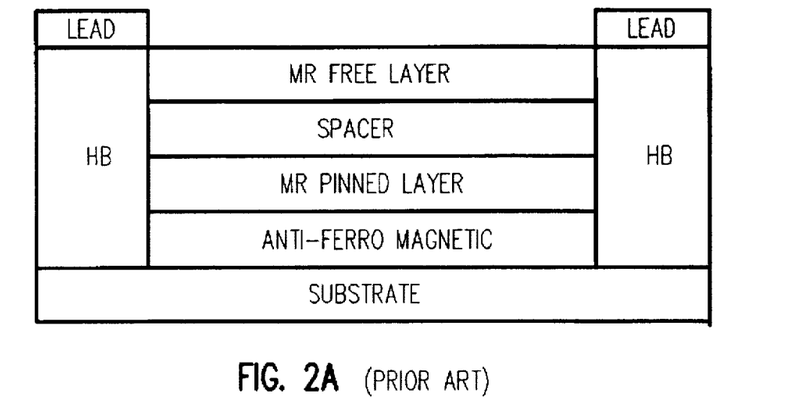

GMR sensors using only two layers of ferromagnetic material (e.g., NiFe or Co or NiFeCo or NiFe/Co) separated by a layer of non-magnetic metallic material (copper) are generally referred to as spin valve (SV) sensors. In an SV sensor, one of the ferromagnetic layers, referred to as the pinned layer, has its magnetization typically pinned by exchange coupling with an antiferromagnetic (e.g., NiO or FeMn) layer. The pinning field generated by the antiferromagnetic layer is usually several hundred Oersteds so that the magnetization direction of the pinned layer remains fixed during the application of external fields (e.g., fields from bits recorded on the disk). The magnetization of the free ferromagnetic layer, however, is not fixed and is free to rotate in response to the field from the disk. FIG. 2A shows a prior art SV sensor having a free MR layer separated from an MR pinned layer by a non-magnetic electrically-conducting spacer layer and further having an anti-ferromagnetic layer for pinning the MR pinned layer.

Figure 2B:
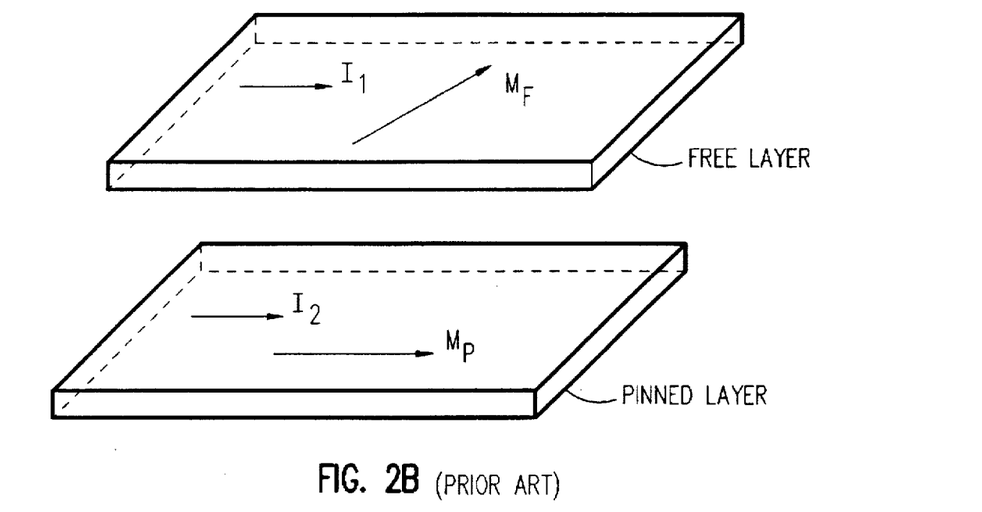
Figure 2C:
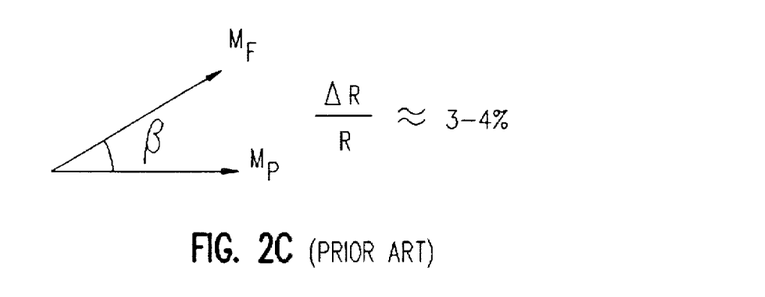

In an SV sensor, the GMR effect depends on the angle between the magnetizations of the free and pinned layers. More specifically, the GMR effect is proportional to the cosine of the angle $\beta$ between the magnetization vector of the pinned layer ($M_P$) and the magnetization vector of the free layer ($M_F$) (FIGS. 2B and 2C). In an SV sensor, the electron scattering and therefore the resistance is maximum when the magnetizations of the pinned and free layers are antiparallel, i.e., majority of the electrons are scattered as they try to cross the boundary between the MR layers. On the other hand, electron scattering and therefore the resistance is minimum when the magnetizations of the pinned and free layers are parallel; i.e., majority of electrons are not scattered as they try to cross the boundary between the MR layers.

In other words, there is a net change in resistance of an SV sensor between parallel and antiparallel magnetization orientations of the pinned and free layers. The GMR effect, i.e., the net change in resistance, exhibited by a typical prior art SV sensor is about 3% to 4%. U.S. Pat. No. 5,206,590 entitled "Magnetoresistive Sensor Based On The Spin Valve Effect", granted to Dieny et al. on Apr. 27, 1993, discloses an MR sensor operating on the basis of the spin valve effect.

MR sensors further fall into two configurations. In one configuration, the sense current is conducted in the MR sensing element parallel to the air bearing surface. Air bearing surface (ABS) refers to the surface of the slider and head adjacent the magnetic disk surface. In the other configuration, the sense current is conducted in the MR sensing element perpendicular to the air bearing surface. The former configuration is referred to as a horizontal MR read sensor and the latter configuration is referred to as an orthogonal MR read sensor.

Figure 3A:
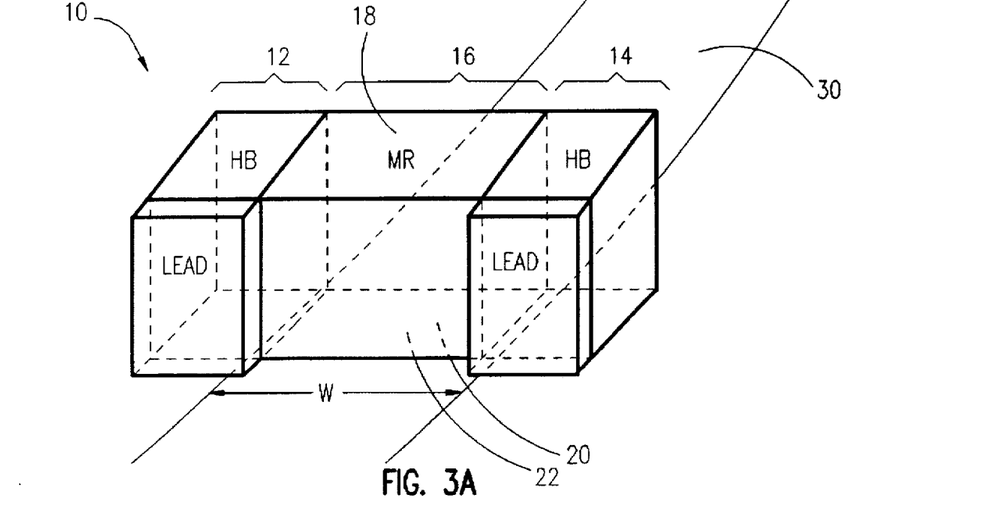
FIGS. 3A and 3B are perspective views of a prior art horizontal and orthogonal MR sensor, respectively, in relationship to an information-carrying track on a magnetic disk.

FIG. 3A shows a perspective view of a horizontal MR sensor 10 having passive end regions 12 and 14 separated by an active central region 16. An MR sensing element 18 having a read surface 20 above a circular track 30 of a storage medium is formed in the central region 16. Read surface 20 forms a part of the air bearing surface 22. In the horizontal MR sensor 10, the MR sensing layer 18 is physically oriented such that its longitudinal axis, and hence its easy axis, is parallel to the trackwidth W of the circular track 30. Note that in the horizontal MR sensor 10 both leads are at the ABS.

Figure 3B:
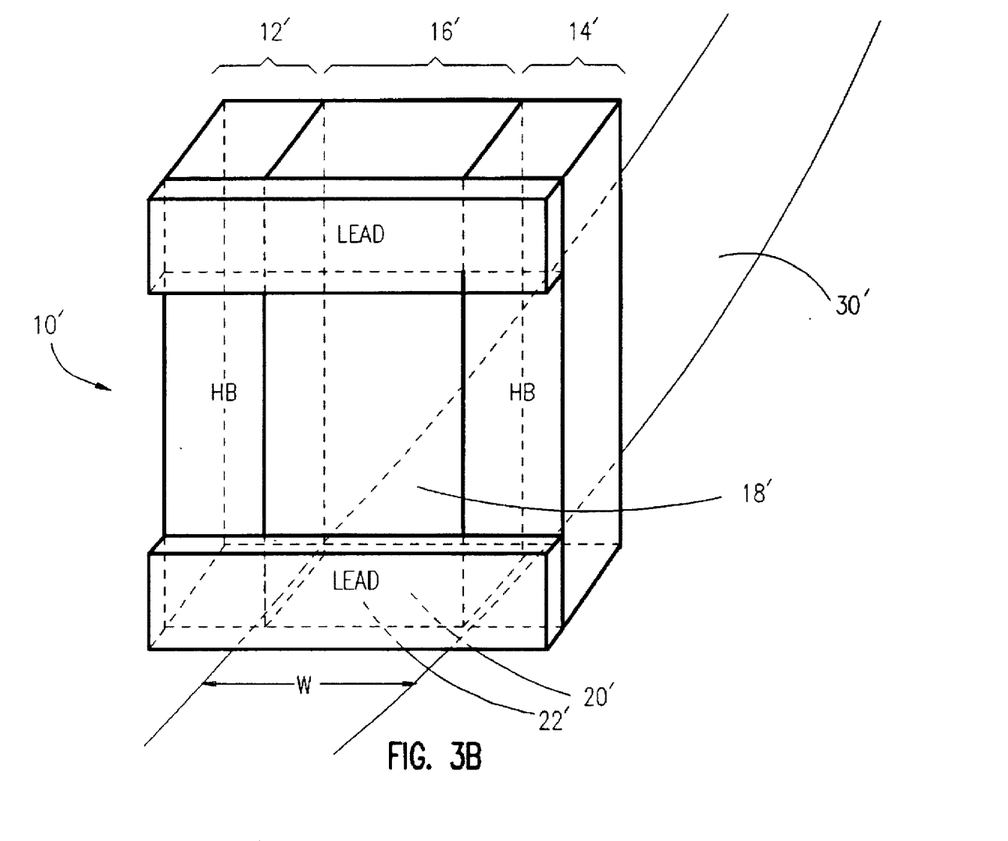

FIG. 3B shows a perspective view of an orthogonal MR sensor 10' having passive end regions 12' and 14' separated by an active central region 16'. An MR sensing layer 18' having a read surface 20' above a circular track 30' of a storage medium is formed in the central region 16'. Read surface 20' forms a part of the air bearing surface 22'. In the orthogonal MR sensor 10', the MR sensing layer 18' is physically oriented such that its longitudinal axis, and hence its easy axis, is parallel to the trackwidth W' of the circular track 30'. Note that in the orthogonal MR sensor 10' only one of the leads is at the ABS.

As it was stated earlier, the magnetoresistance of a spin valve sensor is a function of the angle between the magnetizations of the free and pinned layers. The resistance increases as the angle between the $M_P$ and $M_F$ increases (i.e., as $M_P$ and $M_F$ become antiparallel) and resistance decreases as the angle between $M_P$ and $M_F$ decreases (i.e., as $M_P$ and $M_F$ become parallel). These resistance changes are independent of the direction of the sense current.

However, it is very important to note that the magnetization rotation in the free MR layer also gives rise to anisotropic magnetoresistance (AMR) effect which does depend on the angle between the free layer magnetization vector and the current flowing in the free layer. In other words, in an SV sensor, the GMR effect and the AMR effect are both present and for optimum sensitivity (i.e., optimum magnetoresistance), the contributions of both effects should be utilized. The prior art spin valve sensors have not utilized the contribution of the AMR effect present in the free layer in order to increase the overall sensitivity of the spin valve sensors.

As mentioned earlier, in conventional MR heads having an NiFe MR layer, the AMR effect is about 2%. In SV sensors, the AMR effect is somewhat reduced due to partial current shunting through the copper spacer and the pinned layer. Despite the partial shunting, an AMR effect of about 1% is generally observed in the SV sensors. Adding the AMR effect of about 1% to a typical spin valve GMR effect of about 3% to 4% can increase the overall magnetoresistance effect of the SV sensors by about 33% to 25%, respectively.

Figure 4A:
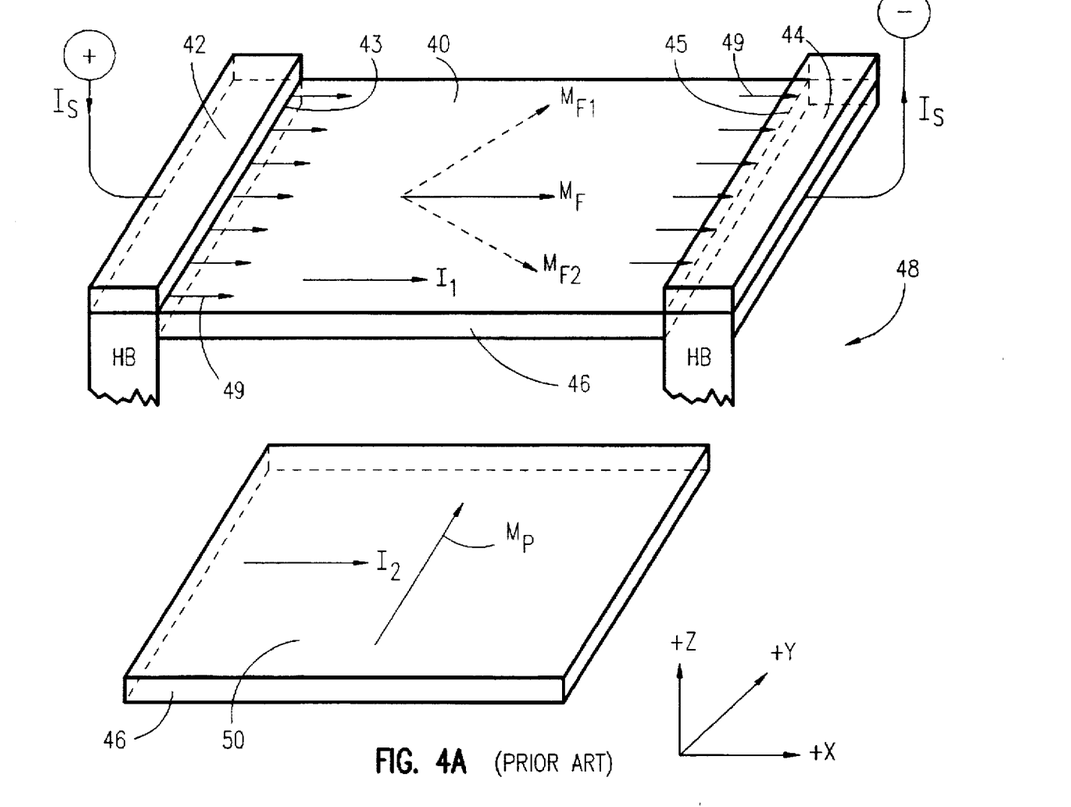
FIGS. 4A and 4B are perspective view of free and pinned layers of the SV sensor of FIG. 2A and diagram of the magnetization vectors in the absence and presence of positive and negative external fields.

Referring to FIG. 4A, there is shown a depiction of a free layer 40 and a pinned layer 50 of a prior art SV sensor 48. In this type of SV sensors, the pinned layer magnetization, $M_P$, is generally oriented to be perpendicular to an air bearing surface 46. The current $I_1$ which is that portion of the sense current that flows in the free layer is oriented to flow parallel to the longitudinal axis of the free layer (parallel to the ABS). The current $I_2$ which is that portion of the sense current that flows in the pinned layer flows parallel to the longitudinal axis of the pinned layer (parallel to the ABS). The internal fields such as ferromagnetic coupling, pinned layer demagnetizing field, and sense current $I_1$ field are also balanced to ensure that the free layer magnetization $M_F$ is perpendicular to the pinned layer magnetization when the external field is zero. External field refers to the field from a magnetic medium which is sensed by the read head while flying in close proximity over the surface of the magnetic medium. The external field is either positive or negative depending on the polarity of the bits of information written onto the magnetic medium. It should be noted that in the SV sensor 48, edges 43 and 45 of leads 42 and 44, respectively, are perpendicular to the air bearing surface 46 and furthermore, leads 42 and 44 form a contiguous junction with the free layer 40. In FIG. 4A, the short arrows 49 indicate the direction at which the current $I_1$ flows in the free layer.

Figure 4B:
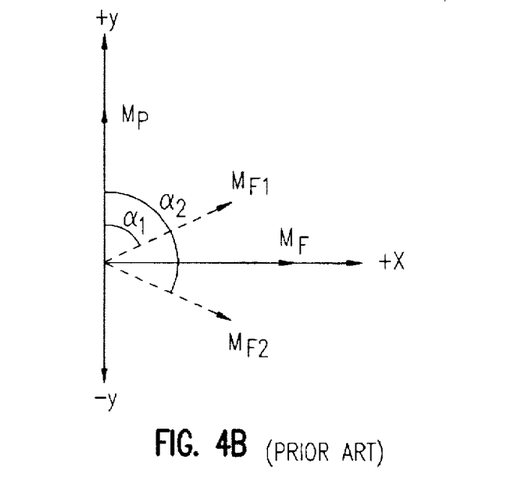

Referring again to FIG. 4A and also to FIG. 4B, for external fields along the +y direction, the free layer magnetization vector $M_F$ rotates to the position $M_{F1}$ forming the $\alpha_1$ and $M_P$. Under this condition, AMR effect present in the free layer 40 and the GMR effect add to each other as shown by equation 1.

$$\Delta R1 = -\Delta R_{GMR} - \Delta R_{AMR} \quad \text{(Eq. 1)}$$

For external fields along the $-y$ direction, the free layer magnetization vector MF rotates to the position $M_{F2}$ forming the angle $\alpha_2$ with $M_P$. Under this condition, AMR effect of the free layer 40 subtracts from the GMR effect as shown by equation 2.

$$\Delta R2 = +\Delta R_{AMR} - \Delta R_{AMR} \quad \text{(Eq. 2)}$$

The net resistance change which is the difference between $\Delta R1$ and $\Delta R2$ is:

$$\Delta R = 2\Delta R \ (GMR) \quad \text{(Eq. 3)}$$

Close inspection of Eq. 3 reveals that in this type of spin valve sensor the net resistance change is only the function of the GMR effect and does not depend on the AMR effect present in the free layer 40.

Therefore, there is a need for an invention which teaches how to substantially eliminate the aforementioned problem and at the same time increase the magnetoresistive effect of SV sensors by ensuring that the net MR effect depends on the AMR effect of the free layer and the GMR effect of the SV sensor regardless of the direction of the external field.

SUMMARY OF THE INVENTION

It is an object of the present invention to disclose a spin valve sensor with an improved MR effect.

It is another object of the present invention to disclose a horizontal spin valve sensor having an improved MR effect.

It is another object of the present invention to disclose an orthogonal spin valve sensor having an improved MR effect.

It is yet another object of the present invention to disclose a spin valve sensor where the MR effect is independent of the direction of external fields.

These and other objects and advantages are attained in accordance with the principles of the present invention by a spin valve read sensor where the current flowing in the free layer ($I_1$) is oriented to flow in the direction which is substantially at a 45 degree angle relative to the free layer magnetization vector. Orienting the current ($I_1$) to flow at a substantially 45 degree angle with respect to the free layer magnetization vector causes the AMR effect of the free layer to always add to the GMR effect of the spin valve sensor in the presence of an external field, regardless of the direction of the external field, thus increasing the overall MR effect of the SV sensor.

The $I_1$ current is oriented to flow at a substantially 45 degree angle with respect to the free layer magnetization vector by using electrical leads (current carrying leads, leads, contacts) having a slanted conducting edge. Unlike the conventional practice, the slanted conducting edge (canted conducting edge) forms a non-zero but less than 90 degree angle with respect to the free layer magnetization vector $M_F$. In the preferred embodiment, the slanted conducting edge is contiguous with the free layer, meaning that it overlays and makes physical contact with the top surface of the free layer. Furthermore, in the preferred embodiment, the slanted conducting edge makes a 45 degree angle with respect to the free layer magnetization vector and the ABS. Since the $I_1$ current flows perpendicular to the slanted conducting edges, it will then flow in the free layer at a 45 degree angle with respect to the free layer magnetization vector.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

FIGS. 2A, 2B and 2C are ABS, a perspective of the free and pinned layers, and a diagram of the magnetization vectors, respectively, of a prior art SV sensor;

BEST MODE FOR CARRYING OUT THE INVENTION

The following description is the best mode presently contemplated for carrying out the invention. This description and the number of alternative embodiments shown are made for the purpose of illustrating the general principle of the present invention and is not meant to limit the inventive concepts claimed herein.

Figure 5:
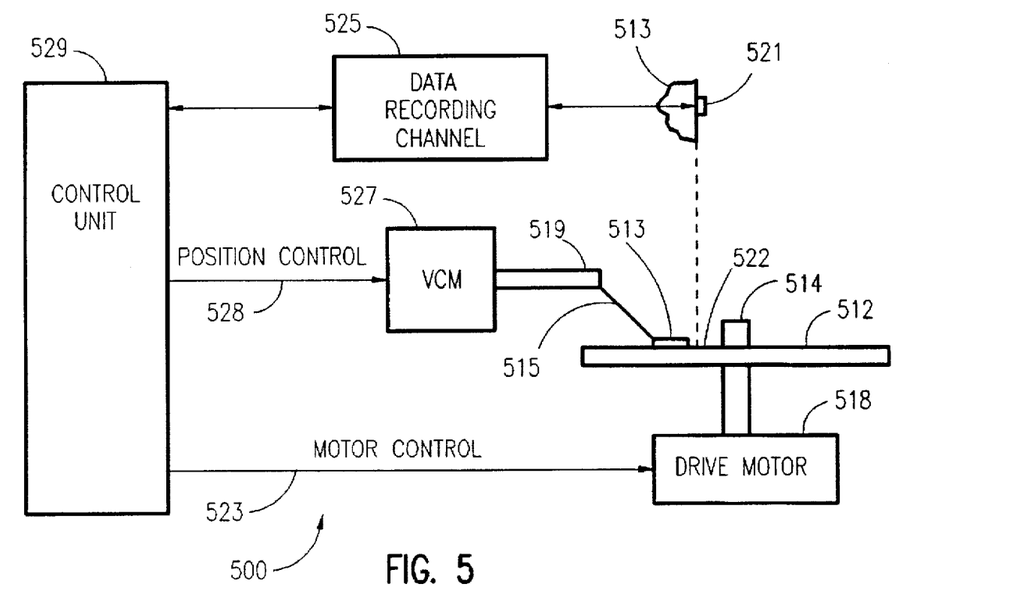
FIG. 5 is a simplified diagram of a magnetic disk storage system embodying the present invention.

Referring now to FIG. 5, although the invention is described as embodied in a magnetic disk storage system as shown in FIG. 5, it will be apparent that the invention is also applicable to other magnetic recording systems such as a magnetic tape recording system. As shown in FIG. 5, at least one rotatable magnetic disk 512 is supported on a spindle 514 and rotated by a disk drive motor 518. The magnetic recording media on each disk is in the form of an annular pattern of concentric data tracks (not shown) on disk 512.

At least one slider 513 is positioned on the disk 512, each slider 513 supporting one or more magnetic read/write heads 521. As the disks rotate, slider 513 is moved radially in and out over disk surface 522 so that heads 521 may access different portions of the disk where desired data is recorded. Each slider 513 is attached to an actuator arm 519 by means of a suspension 515. The suspension 515 provides a slight spring force which biases slider 513 against the disk surface 522. Each actuator arm 519 is attached to an actuator means 527. The actuator means as shown in FIG. 5 may be a voice coil motor (VCM). The VCM comprises a coil movable within a fixed magnetic field, the direction and speed of the coil movements being controlled by the motor current signals supplied by controller 529.

During operation of the disk storage system, the rotation of disk 512 generates an air bearing between slider 513 and disk surface 522 which exerts an upward force or lift on the slider. The air bearing thus counter-balances the slight spring force of suspension 515 and supports slider 513 off and slightly above the disk surface by a small, substantially constant spacing during normal operation.

The various components of the disk storage system are controlled in operation by control signals generated by control unit 529, such as access control signals and internal clock signals. Typically, control unit 529 comprises logic control circuits, storage means and a microprocessor. The control unit 529 generates control signals to control various system operations such as drive motor control signals on line 523 and head position and seek control signals on line 528. The control signals on line 528 provide the desired current profiles to optimally move and position slider 513 to the desired data track on disk 512. Read and write signals are communicated to and from read/write heads 521 by means of recording channel 525.

The above description of a typical magnetic disk storage system, and the accompanying illustration of FIG. 5 are for representation purposes only. It should be apparent that disk storage systems may contain a large number of disks and actuators, and each actuator may support a number of sliders.

Figure 6A:
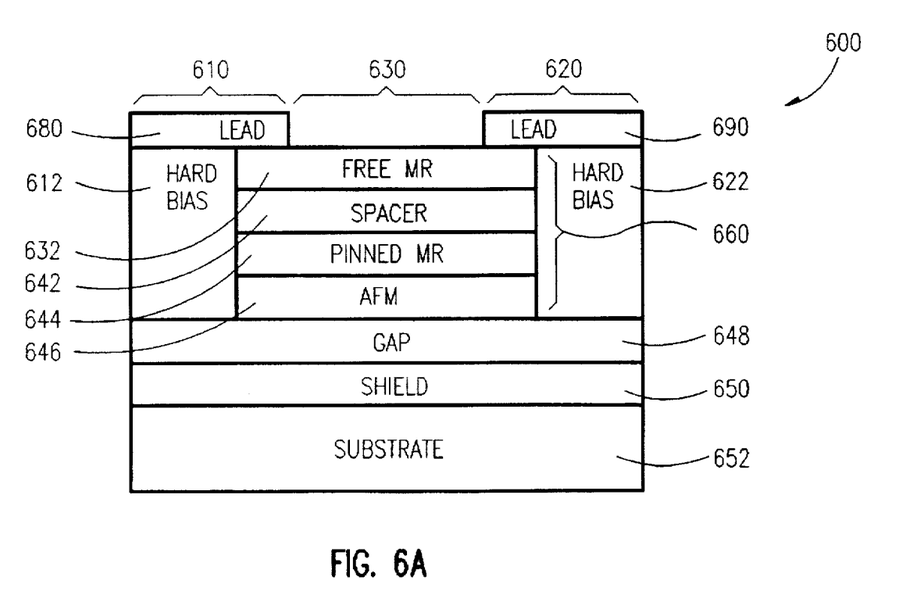
FIGS. 6A and 6B are ABS and perspective views, not to scale, of the spin valve sensor of the preferred embodiment of the present invention.
Figure 6B:
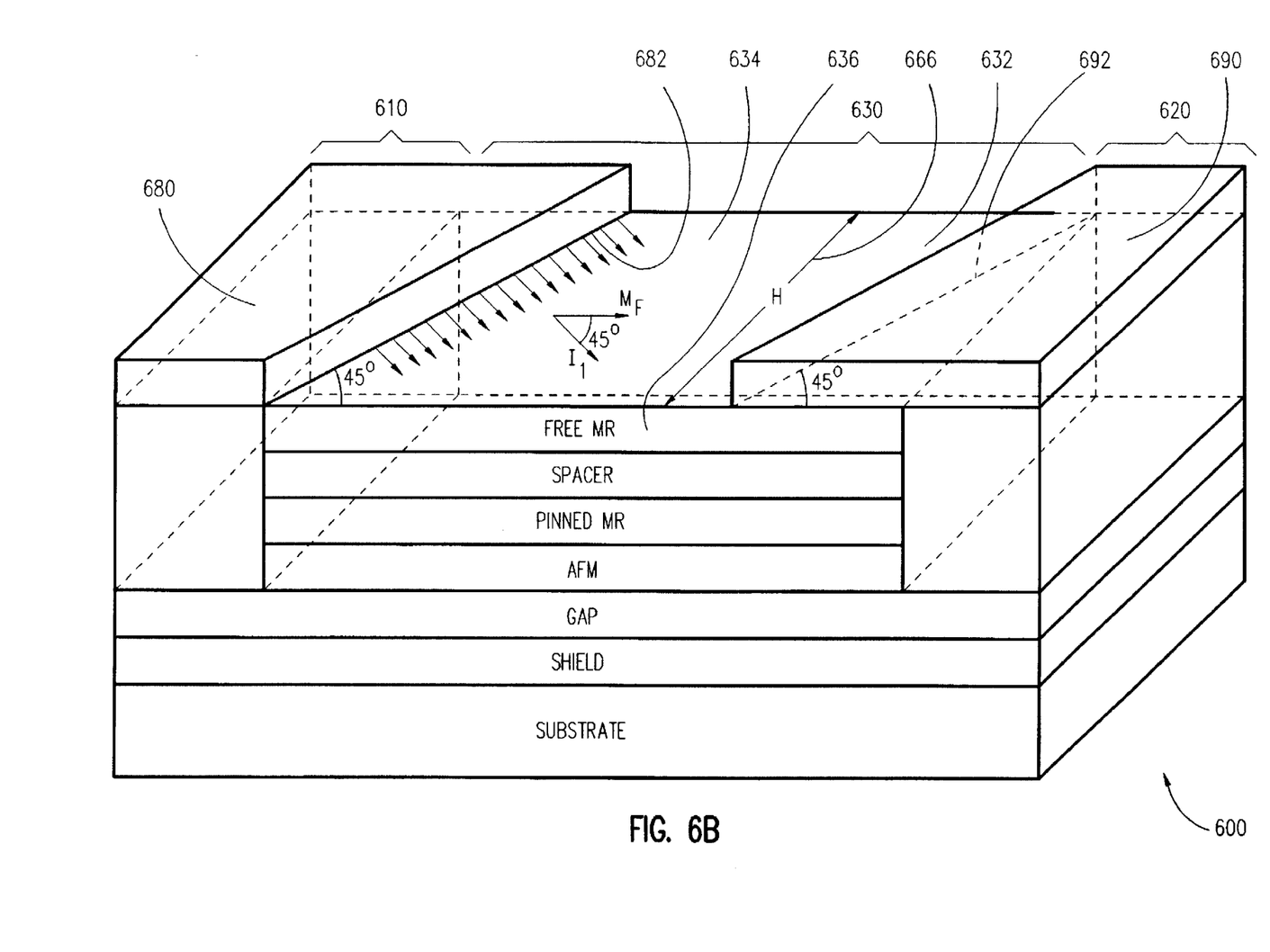

Now referring to FIGS. 6A and 6B, there is shown an air bearing surface view and a perspective view, not to scale, of a spin valve sensor 600 of the preferred embodiment of the present invention comprising passive end regions 610 and 620 separated by a central active region 630. A magnetic shield layer 650 and a gap layer 648 are sequentially formed on a suitable substrate 652. Shield layer 650 provides magnetic isolation for MR sensor 600 and is typically made of NiFe or sendust (TM). Gap layer 648 provides electrical isolation for SV material 660 and is generally made of $Al_2O_3$ or $SiO_2$. After forming gap layer 648, an anti-ferromagnetic layer 646, a pinned MR layer 644, a spacer 642 and a free MR layer 632 are then formed in that order on central region 630 over gap layer 648. Layers 632, 642, 644, and 646 are collectively referred to as SV sensing element (also sensing material) 660. Anti-ferromagnetic (AFM) layer 646 is used to pin the magnetization of the pinned layer 644 in a fixed direction. In the preferred embodiment of the present invention, the pinned layer magnetization is fixed to be perpendicular to the ABS 636. AFM layer 646 is typically made of FeMn, NiO or NiMn. MR layer 644 with its magnetization pinned in a fixed direction (thus the terminology pinned MR layer 644) is made of soft ferromagnetic material, preferably cobalt (Co). Nonmagnetic metallic spacer 642 is preferably made of copper (Cu) although other noble elements may also be used. Free MR layer 632 with its magnetization free to rotate under the presence of an external field is made of soft ferromagnetic material, preferably NiFe or NiFe/Co. Magnetization of the free layer 632 is set to be perpendicular to the pinned layer magnetization in the absence of an external field.

Hard bias layers 612 and 622 which are formed in end regions 610 and 620, respectively, provides a longitudinal bias field which ensures a single magnetic domain state for SV material 660 in central region 630. Hard bias layers 612 and 622 are preferably made of CoPtCr, CoPtCrTa or $CoPtCrSiO_2$. Hard bias layers 612 and 622 further form contiguous junctions with the SV material 660.

Trapezoidal electrical leads 680 and 690 are then deposited over hard bias layers 612 and 622 in the passive end regions 610 and 620, respectively, as well as being deposited over a portion of surface 634 of the free MR layer 632. Trapezoidal leads 680 and 690 have slanted conducting edges 682 and 692, respectively. The slanted conducting edges 682 and 692 are contiguous (i.e., overlay and make physical contacts) with the free layer 632. In the preferred embodiment of the present invention, the slanted conducting edges 682 and 692 are formed only in the central region 630 and are contiguous only with the surface 634 of the free layer 632 and extend the full height 666 of the free layer 632. In the preferred embodiment, the small angle between the slanted conducting edges 682 and 692 and the ABS 636 are about 45 degrees.

A sense current source 740 (FIG. 7A) is electrically connected to the leads 680 and 690 for providing a sense current which is conducted through the spin valve sensor 600. A sensing circuit 750 is also electrically connected to leads 680 and 690, in parallel with the sense current source 740, for sensing potential changes across the SV sensor 600 when the SV sensor 600 is exposed to external fields from a disk.

Figure 7A:
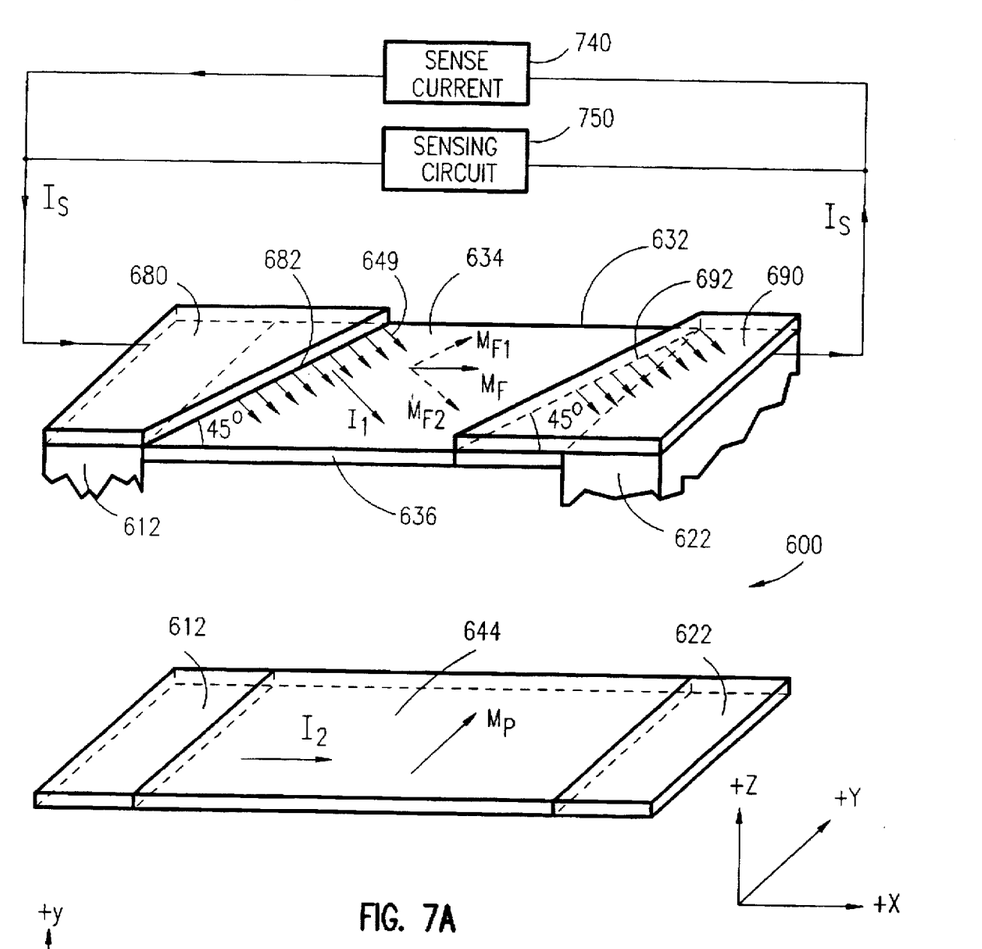
FIGS. 7A and 7B are perspective views of free and pinned layers of the SV sensor of FIGS. 6A and 6B and a diagram of the magnetization vectors in the absence and presence of positive and negative external fields, respectively.
Figure 7B:
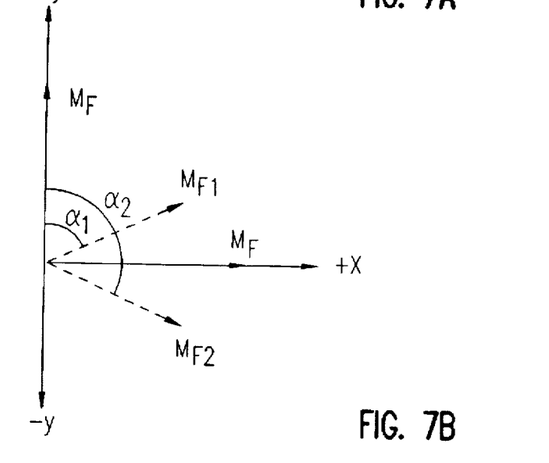

Referring now to FIGS. 7A and 7B, there are shown a perspective view of the free layer 632 (as well as the leads 680 and 690 and a portion of the hard bias layers 612 and 622) and the pinned layer 644 of the SV sensor 600 of FIG. 6B and a diagram of the magnetization vectors $M_F$ and $M_P$ in the absence of an external field and in the presence of positive and negative external fields, respectively.

Now referring to FIGS. 6A, 6B, 7A and 7B, pinned layer magnetization, $M_P$, is pinned in the direction of +y-axis and directed away from the air bearing surface (ABS) such that $M_P$ is perpendicular to the longitudinal axis of the pinned layer 644 (i.e., perpendicular to the ABS).

Once the direction of the $M_P$ is fixed, then the internal fields such as ferromagnetic coupling, pinned layer demagnetizing field, and $I_1$ field are balanced to ensure that at the quiescent bias point (in the absence of an external field such as a field from the disk), the free layer magnetization vector, $M_F$, is perpendicular to the pinned layer magnetization vector $M_P$ in the direction of +x-axis ($M_F$ becomes parallel to the ABS as a result of being perpendicular to $M_P$).

Now referring again to FIG. 7A, note that a portion of the sense current $I_S$ flows in the free layer (designated as $I_1$) and a portion of the sense current $I_S$ flows in the pinned layer (designated as $I_2$). Furthermore, the $I_1$ current flows from the slanted conducting edge 682 into free layer 632 in a 45 degree angle with respect to the free layer magnetization vector. Short arrows 649 indicate the direction at which the current $I_1$ flows. The 45 degree orientation of the current $I_1$ is achieved because $I_1$ current flows perpendicular to the slanted conducting edge 682 which forms a 45 degree angle with the $M_F$ and the ABS 636 of the SV sensor 600. It will be shown below that when current flows at a 45 degree angle with respect to the free layer magnetization at the quiescent condition (i.e., no external field present), the spin valve GMR effect and the AMR effect do add to each other thus increasing the net magnetoresistance of the SV sensor.

Referring again to FIGS. 7A and 7B, at the quiescent bias point the magnetizations of the pinned ($M_P$) and free ($M_F$) layers are perpendicular to each other (i.e., the magnetization vectors are at 90 degree with respect to each other) and current $I_1$ direction forms a 45 degree angle with the free layer magnetization vector. In the presence of external fields along the +y direction, the free layer magnetization vector $M_F$ rotates to the position $M_{P1}$ toward becoming parallel with $M_P$. As $M_F$ rotates toward becoming parallel with Mp (forming the angle $\alpha_1$), the resistance decreases because of spin valve effect in the SV sensor 600 as well as the AMR effect in the free layer 632. Under this condition, AMR effect present in the free layer and the GMR effect, both having the same sign, are added to each other as shown by equation 4.

$$\Delta R1 = \Delta R_{GMR} - \Delta R_{AMR} \qquad (Eq. 4)$$

In the presence of external fields along the −y direction, the free layer magnetization vector $M_F$ rotates to the position $M_{F2}$ toward becoming antiparallel with $M_P$ (forming the angle $\alpha_2$). As $M_F$ rotates toward becoming antiparallel with respect to the $M_P$, resistance increases because of spin valve effect as well as AMR effect in the free layer. Under this condition, the AMR effect of the free layer and the GMR effect of the SV sensor, both having the same sign, add up as shown by equation 5.

$$\Delta R2 = +\Delta R_{GMR} + \Delta R_{AMR} \qquad (Eq. 5)$$

The net resistance change which is the difference between $\Delta R1$ and $\Delta R2$ is:

$$\Delta R = \Delta R1 - \Delta R2 = 2\Delta R\ (GMR) + 2\Delta R\ (AMR) \qquad (Eq. 6)$$

Close examination of equation 6 reveals that, according to the present invention, regardless of the direction of the external field (positive or negative external fields), the AMR effect of the free layer always adds to the GMR effect of the SV sensor and consequently, increases the magnetoresistive effect of the SV sensor. Since GMR effect is about 3% to 4% and the AMR effect observed in SV sensors is about 1%, the present invention increases the total magnetoresistive effect of SV sensors by about 33% to 25%, respectively.

Figure 8A:
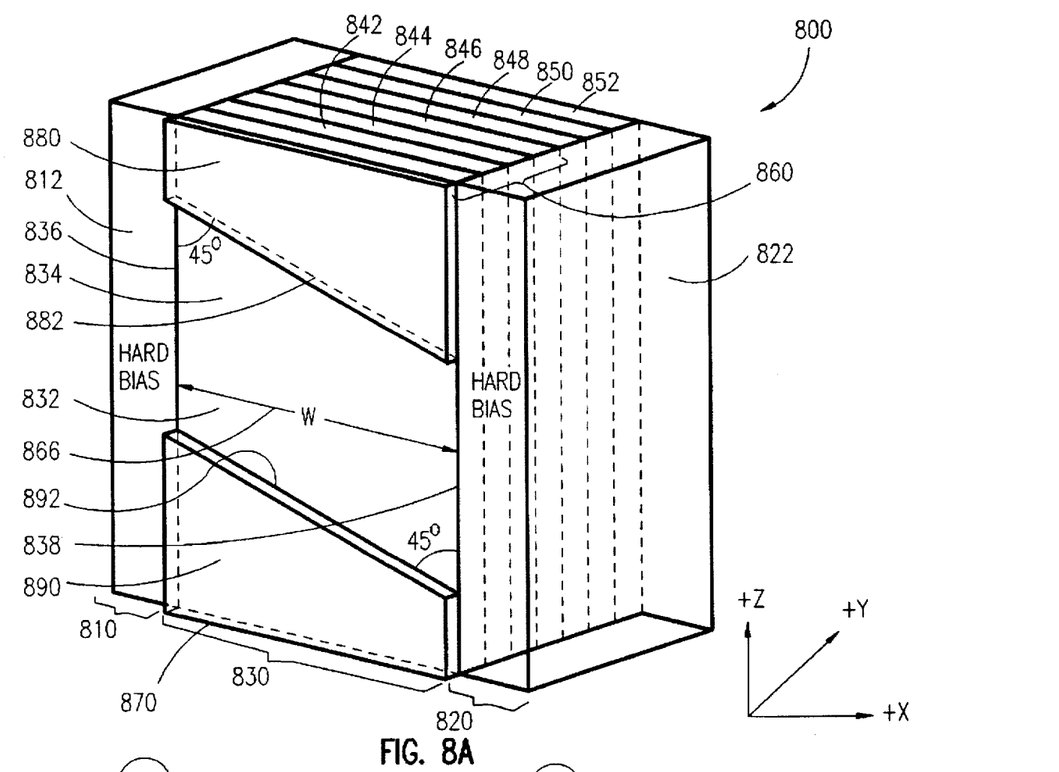
FIG. 8A is a perspective view, not to scale, of an orthogonal spin valve sensor of the present invention.
Figure 8B:
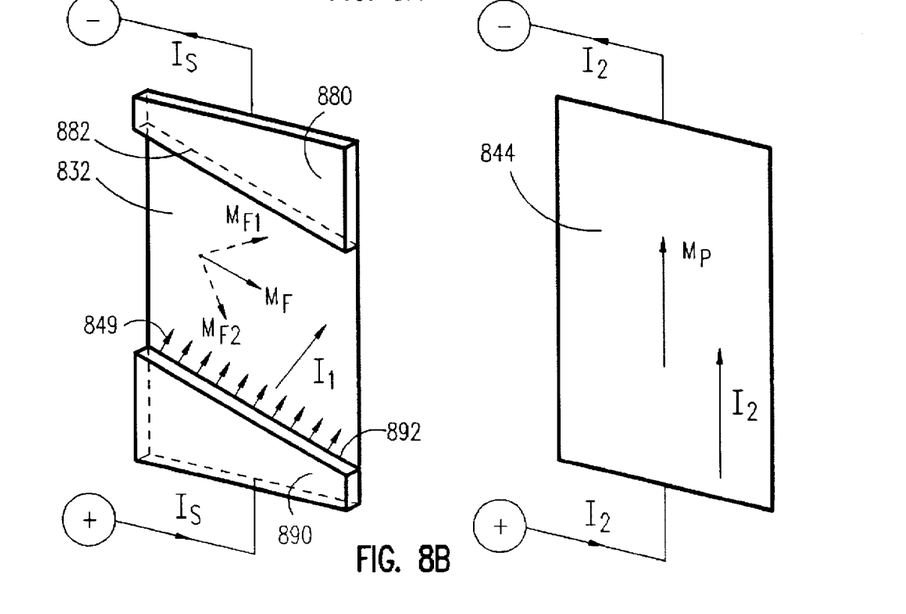
FIG. 8B is a perspective view of the free and pinned layers of the MR sensor of FIG. 8A.

Referring now to FIGS. 8A and 8B, there are shown a perspective view of an orthogonal SV sensor 800 of the present invention and a perspective view of free layer 832 and pinned layer 844 of orthogonal SV sensor 800, respectively. SV sensor 800 comprises passive end regions 810 and 820 separated by a central active region 830. A magnetic shield layer 850 and a gap layer 848 are sequentially formed on a suitable substrate 852. After forming the gap layer 848, an anti-ferromagnetic layer 846, a pinned MR layer 844, a spacer 842 and a free MR layer 832 are then formed in that order on the central region 830 over the gap layer 848. MR layer 832 has side edges 836 and 838 which are substantially perpendicular to the ABS 870. Layers 832, 842, 844, and 846 are collectively referred to as SV sensing element (also sensing material) 860. The anti-ferromagnetic (AFM) layer 846 is used to pin the magnetization of the pinned layer 844 in either the +y direction or −y direction. Magnetization of the free layer 832 is then set to be perpendicular to the pinned layer magnetization in the absence of an external field.

Hard bias layers 812 and 822 which are formed in the passive end regions 810 and 820, respectively, provide a longitudinal bias field to ensure a single magnetic domain state for SV material 860 in central region 830. Hard bias layers 812 and 822 further form contiguous junctions with the SV sensing material 860.

Trapezoidal leads 880 and 890 are then deposited over a portion of surface 834 of the free MR layer 832. Trapezoidal leads 880 and 890 have slanted conducting edges 882 and 892, respectively. The slanted conducting edges 882 and 892 are formed in the central region 830 and are contiguous (i.e., overlay and make physical contact) with the free layer 832. In this embodiment, the slanted conducting edges 882 and 892 extend the full width 866 of the free layer 832 and further form a 45 degree angle with side edges 836 and 838 of the free layer 832, respectively. Note that a portion of the sense current $I_S$ flows in the free layer 832 (designated as $I_1$) and a portion of the sense current $I_S$ flows in the pinned layer 844 (designated as $I_2$). Furthermore, the $I_1$ current flows from the slanted conducting edge 892 into free layer 832 in a 45 degree angle with respect to the free layer magnetization vector. Short arrows 849 indicate the direction at which the current $I_1$ flows.

It is important to note that orienting the $I_1$ current to flow at a 45 degree angle with respect to the free layer magnetization vector is the optimum current flowing angle at which the contribution of the AMR effect present in the free layer to the overall sensitivity of the SV sensor is maximum. As the angle between the $I_1$ current and the free layer magnetization vector approaches 0 degrees (current and the M. become parallel) or approaches 90 degrees (current and the MF approach to become perpendicular), the contribution of the AMR effect to the overall sensitivity of the SV sensor diminishes considerably. The shape of the electrical leads, specifically, the length and the placement of the slanted conducting edges have a substantial effect on the contribution of the AMR effect as shown in the alternative embodiments of FIGS. 9 and 10.

Figure 9:
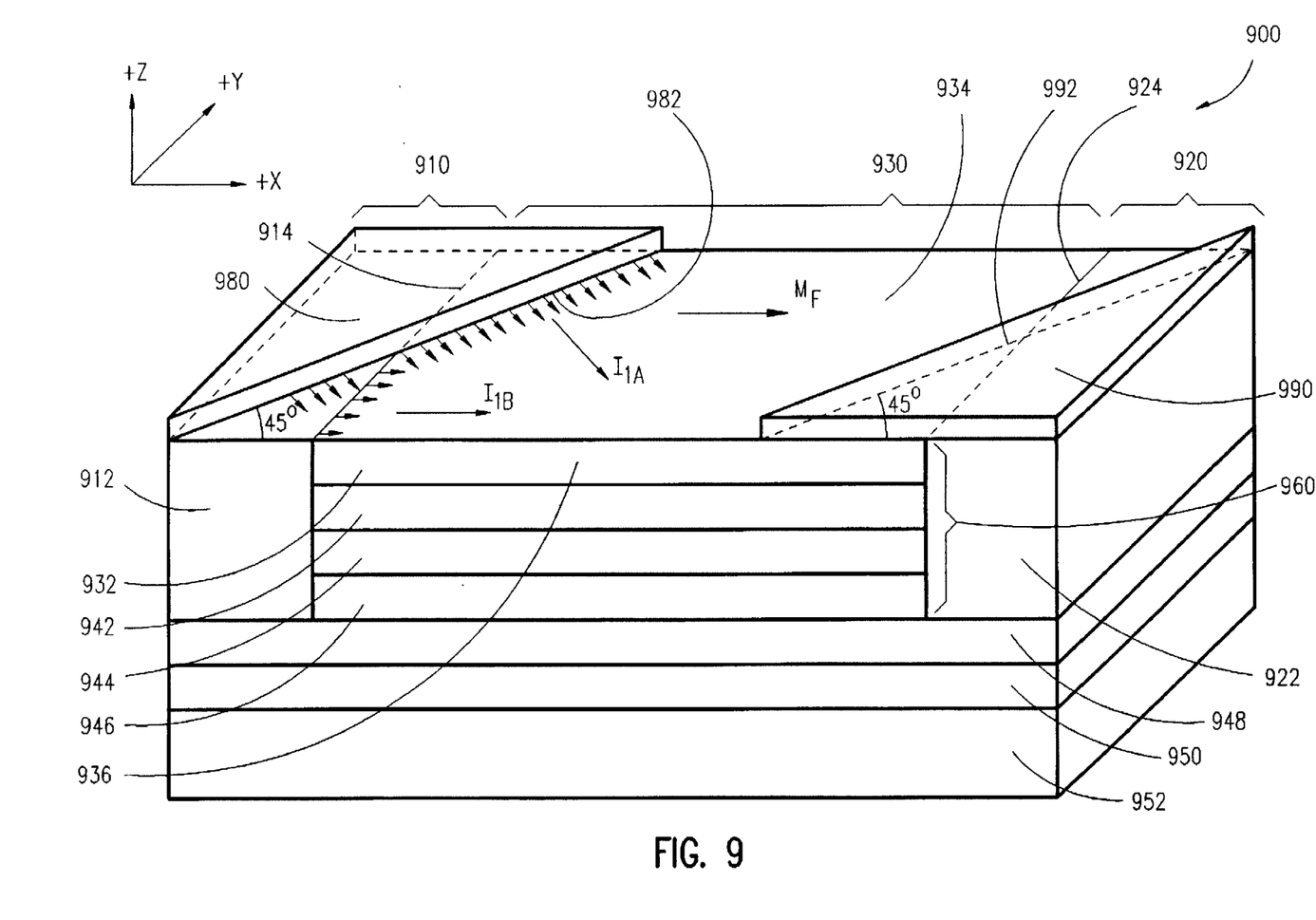
FIG. 9 is a perspective view, not to scale, of an alternative embodiment of the present invention.

Now referring to FIG. 9, there is shown a perspective view of a spin valve sensor 900 of an alternative embodiment of the present invention comprising passive end regions 910 and 920 separated by a central active region 930. A magnetic shield layer 950 and a gap layer 948 are sequentially formed on a suitable substrate 952. After forming the gap layer 948, an anti-ferromagnetic layer 946, a pinned MR layer 944, a spacer 942 and a free MR layer 932 are then formed in that order on central region 930 over gap layer 948. Layers 932, 942, 944, and 946 are collectively referred to as SV sensing element (also sensing material) 960. Magnetization of the free layer 932 is set to be perpendicular to the pinned layer magnetization in the absence of an external field and thus parallel with the air bearing surface (ABS).

Hard bias layers 912 and 922 formed in the passive end regions 910 and 920, respectively, provide a longitudinal bias field. Hard bias layers 912 and 922 further form contiguous junctions with the SV material 960 and have edges 914 and 924, respectively. Edges 914 and 924 are perpendicular to ABS 936.

Triangular electrical leads 980 and 990 are then deposited over a portion of the passive end regions 910 and 920, respectively, as well as being deposited over a portion of the surface 934 of free MR layer 632. Triangular leads 980 and 990 have slanted conducting edges 982 and 992, respectively. Slanted conducting edge 982 overlay and makes physical contact with the hard bias layer 912 and the top surface 934 of the free MR layer 932. Likewise, the slanted conducting edge 992 overlay and makes physical contact with the hard bias layer 922 and the top surface 934 of the free MR layer 932. The slanted conducting edges 982 and 992 further form a 45 degree angle with the free layer magnetization vector and therefore, with the ABS 936 of the SV sensor 900 in the direction of the +x-axis.

Note that in this embodiment, since each of the slanted conducting edges overlays and makes physical contact with both the hard bias material and the free MR layer 932, a portion of the current $I_1$ flows at a 45 degree angle with respect to the free layer magnetization (shown as $I_{1A}$) and a portion of the current $I_1$ flows parallel with respect to the free layer magnetization (shown as $I_{1B}$). More specifically, current $I_{1A}$ which flows out of that portion of the slanted conducting edge 982 which is formed over the free layer 932 flows at a 45 degree angle with respect to the free layer magnetization and current $I_{1B}$ which flows out of that portion of the slanted conducting edge 982 which is formed over the hard bias layer 912 flows parallel with respect to the free layer magnetization due to the hard bias layer being a conductor itself. As a result, the contribution of the AMR effect to the overall magnetoresistance of the SV sensor 900 is less than the optimum condition (preferred embodiment shown in FIGS. 6A and 6B) when all of the $I_1$ current flows at a 45 degree angle with respect to the free layer magnetization vector.

Figure 10:
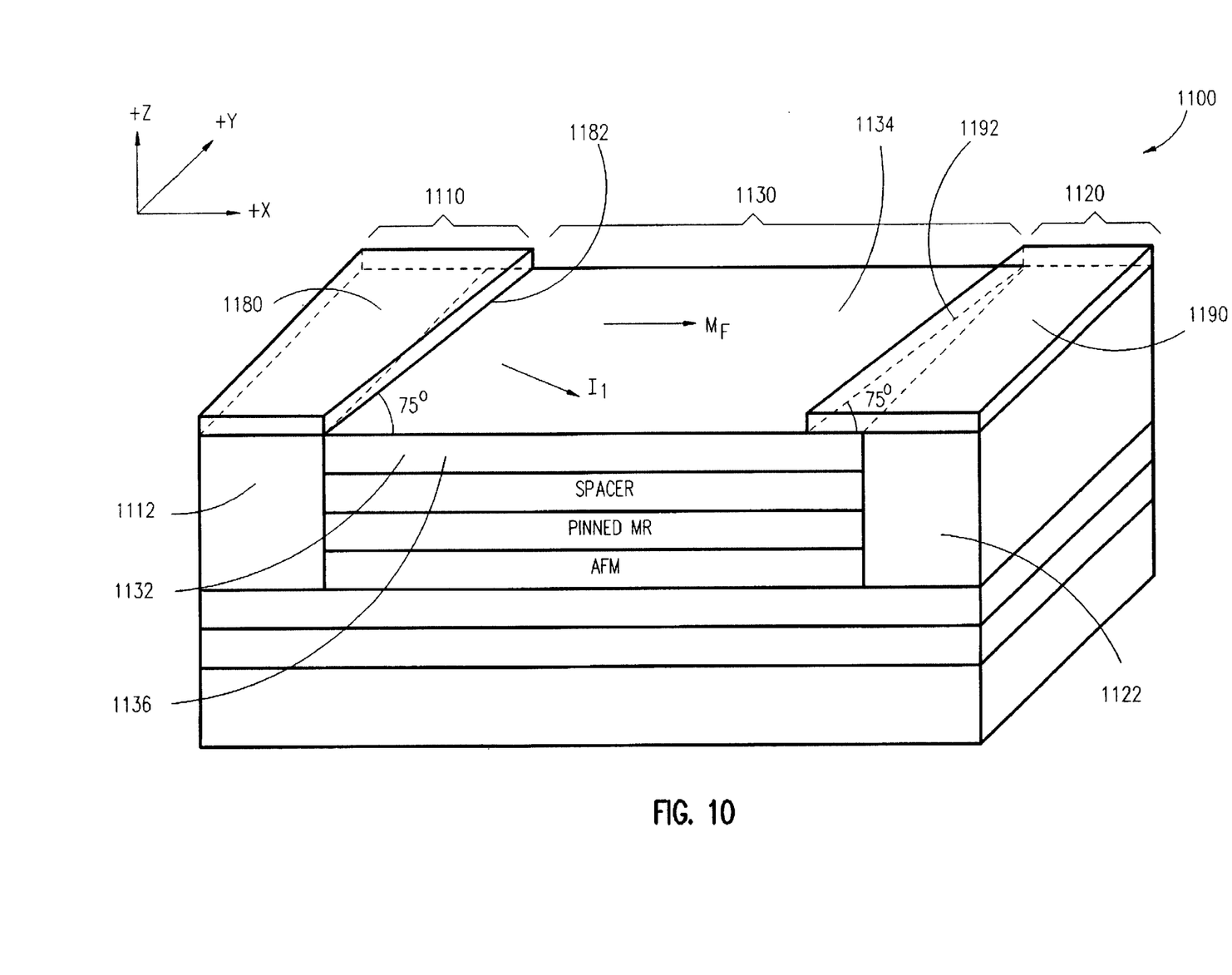
FIG. 10 is a perspective view, not to scale, of another alternative embodiment of the present invention.

Now referring to FIG. 10, there is shown a perspective view of an SV sensor 1100 of another alternative embodiment of the present invention comprising passive end regions 1110 and 1120 separated by a central active region 1130. In this SV sensor, the pinned layer magnetization is set to be perpendicular to the air bearing surface 1136 and the magnetization of the free layer 1132 is set to be perpendicular to the pinned layer magnetization vector in the absence of an external field. Hard bias layers 1112 and 1122 are formed in the passive end regions 1110 and 1120, respectively, and form contiguous junctions with the free layer 1132.

Trapezoidal electrical leads 1180 and 1190 are then formed over passive end regions 1110 and 1120, respectively, as well as being formed over a portion of surface 1134 of the free MR layer 1132. Trapezoidal leads 1180 and 1190 have slanted conducting edges 1182 and 1192, respectively. The slanted conducting edges 1182 and 1192 are formed over the free layer 1132 in the central active region 1130, overlay and make physical contact with the surface 1134 of the free layer 1132. Furthermore, in this embodiment, the small angles between the slanted conducting edges 1182 and 1192 and the ABS 1136 are about 75 degrees.

Note that in the embodiment of FIG. 10, since the angles between the slanted conducting edges 1182 and 1192 and the ABS 1136 are about 75 degree angles, the angle between the sensing current and the free layer magnetization vector is about 15 degrees. As a result, the contribution of the AMR effect to the overall SV sensor magnetoresistive effect is less than the optimum condition when all the $I_1$ current flows at a 45 degree angle with respect to the free layer magnetization vector.

While the present invention has been particularly shown and described with reference to the preferred embodiment thereof, nevertheless, it will be understood by those skilled in the art that various modifications may be made therein without departing from the spirit, scope, and teaching of the present invention.

For example, although the preferred embodiment of the present invention was described in terms of a spin valve MR sensor where the sensing current flows at a 45 degree angle with respect to the free layer magnetization at the quiescent point, the invention is equally applicable to embodiments where the sensing current flows at any angle greater than zero and less than 90 degree with respect to the free layer magnetization vector.

Furthermore, although the preferred embodiment and the alternative embodiments of the present invention were described in terms of a spin valve sensor having trapezoidal or triangular shape leads, the invention is equally applicable to embodiments where the leads have no commonly defined shape as long as each lead has a slanted conducting edge where the slanted conducting edge partially overlays and makes physical contact with a surface of the free MR layer and where the slanted conducting edge forms an angle greater than zero but less than 90 degrees with respect to the air bearing surface.

Furthermore, although in the preferred embodiment of the present invention the pinned layer magnetization, $M_P$, is pinned along the +y axis and directed away from the air bearing surface, it is well understood that $M_P$ could be pinned along the −y axis toward the ABS.

Accordingly, it is to be understood that the invention disclosed herein is not to be limited by the illustrated embodiment, but only by the scope of the appended claims.

I claim:

1. A spin valve (SV) magnetoresistive sensor having an air bearing surface (ABS), said spin valve sensor comprising:
   end regions separated by a central region;
   a magnetoresistive (MR) element formed in said central region, said MR element including:
      a pinned layer formed in said central region, said pinned layer having a pinned layer magnetization perpendicular to said ABS;
      a free layer formed in said central region, said free layer having a free layer magnetization perpendicular to said pinned layer magnetization; and
      a spacer layer formed in said central region, said spacer layer disposed between said free layer and said pinned layer; and
   a first and a second electrical lead in contact with said free layer, each of said electrical leads having a slanted conducting edge for orienting current flow at a non-zero less than 90 degree angle with respect to said free layer magnetization, each of said slanted conducting edges are contiguous with said free layer.

2. An SV magnetoresistive sensor as recited in claim 1 wherein said MR element further comprises:
   an anti-ferromagnetic (AFM) layer exchange coupled with said pinned layer for pinning the magnetization of said pinned layer perpendicular to said ABS, said AFM is formed in said central region.

3. An SV magnetoresistive sensor as recited in claim 2 further comprising:
   hard bias layers formed in said end regions of said SV sensor to longitudinally bias said SV sensor, said hard bias layers forming a contiguous junction with said MR sensing element in the central region.

4. An SV magnetoresistive sensor as recited in claim 3 wherein said free layer is selected from a group of materials consisting of NiFe and NiFe/Co.

5. An SV magnetoresistive sensor as recited in claim 3 wherein said pinned layer comprises cobalt.

6. An SV magnetoresistive sensor as recited in claim 3 wherein said spacer layer comprises copper.

7. An SV magnetoresistive sensor as recited in claim 3 wherein said AFM layer is selected from a group of materials consisting of FeMn, NiMn and NiO.

8. An SV magnetoresistive sensor as recited in claim 3 wherein said hard bias layers are selected from a group of materials consisting of CoPtCr, CoPtCrTa, and CoPtCrSiO2.

9. An SV magnetoresistive sensor as recited in claim 3 wherein each of said slanted conducting edges forms an angle with respect to said free layer magnetization in the range of about 30 to 60 degrees.

10. An SV magnetoresistive sensor as recited in claim 3 wherein each of said slanted conducting edges are contiguous only with said free layer, each of said slanted conducting edges further forms an angle with respect to said free layer magnetization in the range of about 30 to 60 degrees.

11. An SV magnetoresistive sensor as recited in claim 3 wherein each of said slanted conducting edges are contiguous with said free layer and with only one of said hard bias layers, said slanted conducting edge further forms an angle with respect to said free layer magnetization in the range of about 30 to 60 degrees.

12. A magnetic storage system, comprising:
   a magnetic storage medium for recording data;
   a spin valve (SV) magnetoresistive sensor for reading information from said magnetic storage medium, said SV sensor having an air bearing surface (ABS), said spin valve sensor comprising:
      end regions separated by a central region;
      magnetoresistive (MR) element formed in said central region, said MR element including:
         a pinned layer formed in said central region, said pinned layer having a pinned layer magnetization perpendicular to said ABS; and
         a free layer formed in said central region, said free layer having a free layer magnetization perpendicular to said pinned layer magnetization; and
         a spacer layer formed in said central region, said spacer layer disposed between said free layer and said pinned layer;
      a first and a second electrical lead in contact with said free layer, each of said electrical leads having a slanted conducting edge for orienting current flow at a non-zero less than 90 degree angle with respect to said free layer magnetization, each of said slanted conducting edges are contiguous with said free layer; and
      a recording channel coupled to said magnetoresistive sensor for detecting resistance changes in said magnetoresistive sensing element responsive to applied magnetic fields representative of data bits recorded in said magnetic storage medium.

13. A magnetic storage system as recited in claim 12 wherein said MR element further comprises:
   an anti-ferromagnetic (AFM) layer exchange coupled with said pinned layer for pinning the magnetization of said pinned layer perpendicular to said ABS, said AFM formed in said central region.

14. A magnetic storage system as recited in claim 13 wherein said SV magnetoresistive sensor further comprises:
   hard bias layers formed in said end regions of said SV sensor to longitudinally bias said SV sensor, said hard bias layers forming a contiguous junction with said MR sensing element in the central region.

15. A magnetic storage system as recited in claim 14 wherein said free layer is selected from a group of materials consisting of NiFe and NiFe/Co.

16. A magnetic storage system as recited in claim 14 wherein said pinned layer comprises cobalt.

17. A magnetic storage system as recited in claim 14 wherein said spacer layer comprises copper.

18. A magnetic storage system as recited in claim 14 wherein said AFM layer is selected from a group of materials consisting of FeMn, NiMn and NiO.

19. A magnetic storage system as recited in claim 14 wherein said hard bias layers are selected from a group of materials consisting of CoPtCr, CoPtCrTa, and CoPtCrSiO2.

20. A magnetic storage system as recited in claim 14 wherein each of said slanted conducting edges forms an angle with respect to said free layer magnetization in the range of about 40 to 50 degrees.

21. A magnetic storage system as recited in claim 14 wherein each of said slanted conducting edges is contiguous only with said free layer, each of said slanted conducting edges further forms an angle with respect to said free layer magnetization in the range of about 30 to 60 degrees.

22. A magnetic storage system as recited in claim 14 wherein each of said slanted conducting edges forms a contiguous junction with said free layer and with only one of said hard bias layers, said slanted conducting edge further forms an angle with respect to said free layer magnetization in the range of about 30 to 60 degrees.

* * * * *